UNITED STATES PATENT OFFICE.

HARRY SNELL, OF HANOVER, MASSACHUSETTS, ASSIGNOR OF ONE-THIRD TO GEORGE J. J. CLARK AND ONE-THIRD TO DANIEL J. HEAD, BOTH OF WEST HANOVER, MASSACHUSETTS.

SHOE-FILLER.

1,153,139.   Specification of Letters Patent.   Patented Sept. 7, 1915.

No Drawing.   Application filed December 29, 1914.   Serial No. 879,611.

*To all whom it may concern:*

Be it known that I, HARRY SNELL, a citizen of the United States, and a resident of Hanover, in the county of Plymouth and State of Massachusetts, have invented an Improvement in Shoe-Fllers, of which the following description is a specification.

This invention relates to a new composition of matter. While the composition may be used for various purposes and in different relations, I primarily intend it for use as a shoe filler that is to be applied to the shoe to fill the cavity of the inner sole level with the welt, thereby to place it in condition for receiving the outer sole.

An important object of my invention is to provide a shoe filler that will not crack, and which is flexible, waterproof and sets quickly.

In carrying out my invention, the ingredients or certain of them are heated and the composition is preferably applied to the shoe in a heated condition.

The shoe filler embodying my invention preferably contains cork or like substance, certain adhesive matter and a waterproof substance. Said cork or like substance constitutes a base of finely divided material or a finely divided base material. The cork should be applied in granular form, and it is rendered waterproof by incorporating therewith some suitable waterproofing material, which is in itself flexible after it has been incorporated as an ingredient of the composition. For this purpose, I preferably employ a vulcanized or sulfur chloridized oil,—preferably a vegetable oil, and with or without other admixture. Such oil is a waterproofing liquid or fluent material which is thick and tough but flexible and which sets quickly. I have found in practice that such material does not only not crack or become brittle in itself, but when incorporated with the cork and other ingredients of the composition retain such qualities. The cork preferably in a comminuted condition is rendered thoroughly waterproof by the application of the said oil or admixture thereto, with which it becomes thoroughly impregnated. With the waterproofing material, I preferably add a suitable amount of rosin, which not only acts as an adhesive or binder, but also adds to the waterproofing qualities of the composition. With the said ingredients, I also preferably employ a suitable quantity of a material possessing strong adhesive qualities. For this purpose I preferably employ a compound of castor-oil and a gum-resin having the characteristics of the copal class of resins;—either alone or having combined therewith other ingredients preferably of a waxy nature. Said compound has permanency over a wide range of temperature. It does not change its viscosity appreciably within the range of ordinary atmospheric temperatures. Under the heat of the sun it does not flow nor run appreciably, nor does it lose its "tackiness" under moderate cold. When exposed to the air in an unmixed condition it remains sticky for a lengthy period of time. While I may employ the foregoing ingredients in any desired proportion, I preferably use the following proportions: cork 2 lbs., rosin 1 lb., castor-oil and gum-resin 1 lb., vulcanized or sulfur chloridized oil 1 gill.

In preparing the composition I melt the rosin and the castor-oil and gum-resin, adding thereto the vulcanized oil, preferably in a heated condition, and when the composition is soft and of a water-like consistency, I add the cork in granular condition.

The composition is allowed to harden, being preferably molded into the shape of loaves and is heated for application to the shoe. A shoe filler constructed as above described will not burn, nor will it crack, and in manufacturing the same, I am enabled to make a saving in cementitious material. Not only is the composition thoroughly waterproof, but it sets quickly, and remains flexible throughout the life of the shoe. Moreover when a sole of a shoe is removed for repair, the shoe filler will retain its proper position in the shoe, thereby facilitating the repairing of the latter.

Having thus described one embodiment of my invention and the best mode known by me for carrying the same into effect, I desire it to be understood that although specific terms are employed, they are used in a generic and descriptive sense and not for purposes of limitation, the scope of the invention being set forth in the following claims.

Claims:

1. A shoe filler or like composition, comprising comminuted cork-like material, rosin, vulcanized oil and castor-oil and gum-resin.

2. A shoe filler or like composition comprising cork, rosin, vulcanized oil and castor-oil and gum-resin in substantially the following proportions, namely, cork 2 lbs., rosin 1 lb., castor-oil and gum-resin 1 lb., and vulcanized oil 1 gill.

3. A shoe filler or like composition comprising a base of finely divided material, rosin, vulcanized oil and castor oil and gum-resin in substantially the following proportions, namely, finely divided base material 2 pounds, rosin 1 pound, castor oil and gum resin 1 pound, and vulcanized oil 1 gill.

4. A shoe filler or like composition including a finely divided base material, rosin and vulcanized oil in substantially the following proportions, namely, finely divided base material 2 pounds, rosin 1 pound, and vulcanized oil 1 gill.

In testimony whereof, I have signed my name to this specification, in the presence of two subscribing witnesses.

HARRY SNELL.

Witnesses:
GEORGE J. J. CLARK,
DANIEL J. HEAD.